May 31, 1927. 1,630,816
G. WILCOX
CLUTCH MECHANISM
Filed June 12, 1924   2 Sheets-Sheet 1
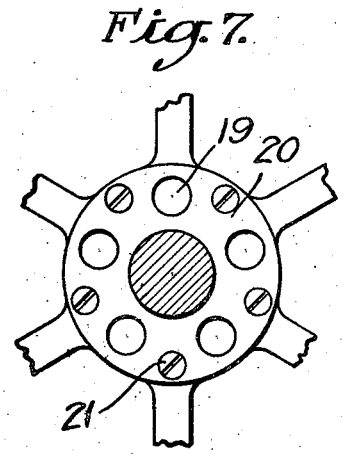
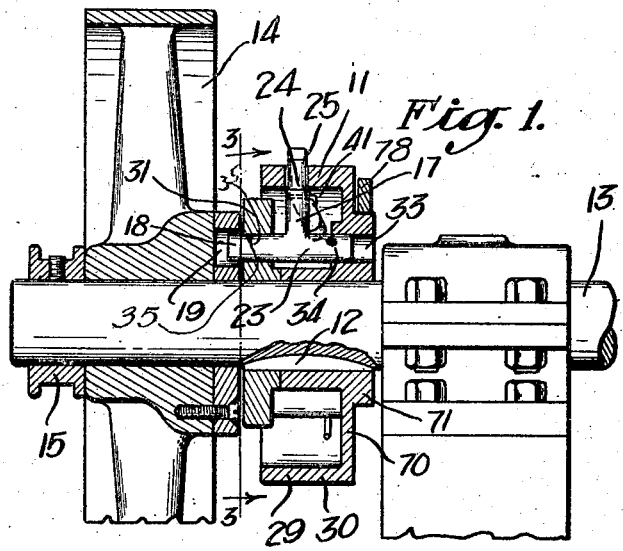
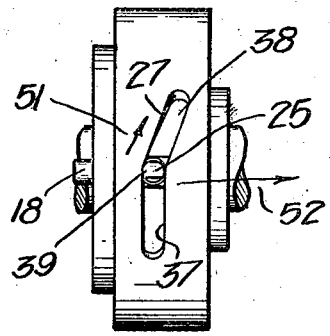
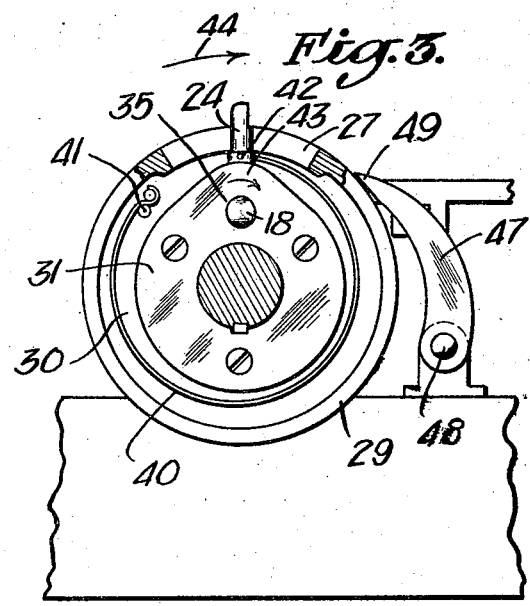
INVENTOR:
GEORGE WILCOX,
BY
ATTORNEYS.

May 31, 1927.  1,630,816
G. WILCOX
CLUTCH MECHANISM
Filed June 12, 1924  2 Sheets-Sheet 2
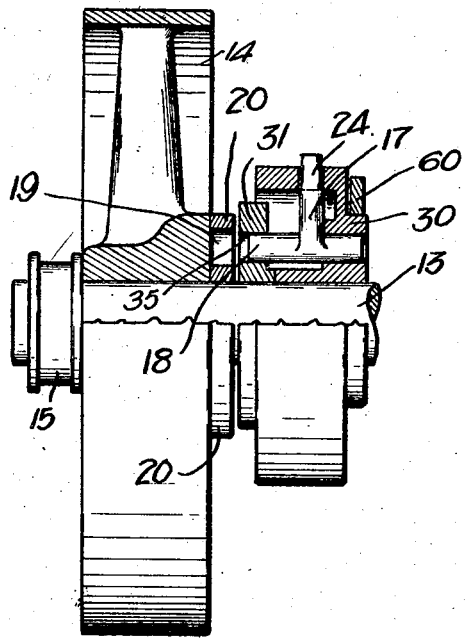
Fig. 2.
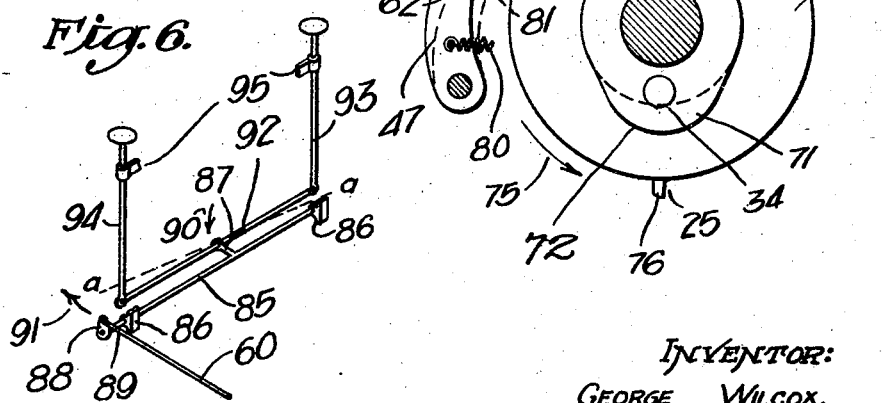
Fig. 5.
Fig. 6.
INVENTOR:
GEORGE WILCOX,
BY
ATTORNEYS.

Patented May 31, 1927.

1,630,816

UNITED STATES PATENT OFFICE.

GEORGE WILCOX, OF RIVERSIDE, CALIFORNIA, ASSIGNOR TO CALIFORNIA CANNING MACHINERY CO., A CORPORATION OF CALIFORNIA.

CLUTCH MECHANISM.

Application filed June 12, 1924. Serial No. 719,500.

This invention relates to clutch mechanism employed for the purpose of transferring motion from one rotating member to another. It is an object of the invention to provide a clutch whereby an intermittent rotary motion may be derived from a constantly rotating member.

It is a further object of the invention to provide a clutch which will be very sensitive in operation and may therefore be readily engaged and disengaged. In certain types of hand operated machines, the object upon which the operation is made, is manually placed in the machine. In such types of machines, a manually operated clutch is employed for drawing the machine into action. Injury to workers has occurred due to the throwing in of the clutch with one hand while the other hand is yet in a position in the path of a moving part of the machine and also injury has resulted from the clutch repeating, or in other words, failing to stop at the first actuation of the machine and continuing through repeated actuations.

The especial advantages of the invention and further objects thereof will be made evident hereinafter.

Referring to the drawings which are for illustrative purposes only:

Fig. 1 is a partially sectioned elevation showing an embodiment of my invention with the parts thereof in power transmitting relationship.

Fig. 2 is a partially sectioned view showing the clutch mechanism disengaged.

Fig. 3 is a section taken upon a plane represented by the line 3—3 of Fig. 1.

Fig. 4 is a plan view of the clutch member.

Fig. 5 is a fragmentary view showing the clutch-actuating mechanism.

Fig. 6 is a perspective view showing the clutch-operating levers.

Fig. 7 is a fragmentary view showing the clutch plate secured to the driving member.

The embodiment of my invention shown in the drawings employs a driven clutch member 11 arranged to be keyed as shown at 12 upon a shaft 13 which is to be driven by a rotating member such as the pulley 14, which may be loosely mounted upon the shaft and prevented from removal by a collar 15. As shown in Figs. 1 and 2, the member 11 is provided with a longitudinally slidable engagement member 17 having an engagement end 18 arranged to project into openings 19 formed in a tempered tool steel plate 20 which is secured by bolts or screws 21 to the pulley 14 and thereby becomes part of the pulley driving member. The engagement member 17 is also made from tool steel and properly tempered and is given the form of a cylindrical bar 23 which is shown as rotatable on its own longitudinal axis and of which the end 18 forms a part and a perpendicularly extending operating arm 24, the outer end 25 of which projects through a cam slot 27 formed in the outer cylindrical wall 29 of a primary casting comprising plate 30 which cooperates with a secondary plate 31 in forming the member 11. The casting 30 is provided with a reamed opening 33 which slidably receives the rearward end 34 of the engagement member 17 and the plate 31 is provided with a corresponding and aligned opening 35 in which the forward or engagement end 18 of the bar 23 is slidable. The cam slot 27 consists of a radial portion 37 which lies in a plane perpendicular to the rotational axis of the member 11 and a sloped portion 38 disposed at an angle with respect to the portion 37. When the outer end 25 of the operating arm 24 rests in the slot portion 37, or at the forward end 39 of the sloping portion 38, the cylindrical bar 23 is disposed in such position that the engagement end 18 thereof will project from the plate 30 and is therefore in position to engage one of the openings 19 of the drive plate 20. A spring 40 secured at one end between pins 41 (shown as projecting inwardly or forwardly from plate 30) and having the other end thereof engaging the operating arm 24 at 42, continually exerts a resilient force in the direction indicated by the arrow 43, Fig. 3, thus tending to hold the arm 24 at the rearward end of the slot, or in other words, in the positions shown in Figs. 1, 3 and 4. The clutch is arranged to be driven in the direction of the arrow 44, Fig. 3 and, as shown in Fig. 3, an operating pawl 47 is pivoted at 48. The forward end 49 of the pawl, when released, assumes a position on the outer cylindrical face of the wall 29, Fig. 3, and is therefore in the path of the projecting end 25 of the operating arm 24 so that as the clutch is rotated forwardly in the direction of the arrow 44, it will be engaged by the end 49 of the pawl and prevented from further forward movement, whereas the body 11 of the clutch will continue to move forwardly due to momentum and also due to engagement of the engagement end 18 with the plate 20, thus producing a relative movement of the operating arm 24, which is rearward with respect to the body 11 as indicated by the arrow 51, Fig. 4. This rearward movement of the arm 24 causes it to advance into the sloped portion 38 of the cam slot 27 in the direction of the arrow 51, therefore producing a lateral movement in the engagement member 17 in the direction of the arrow 52, Fig. 4, and moves into the position in which it is shown in Fig. 2, thus withdrawing the engagement end 18 from the opening 19 in the plate 20. The driven member 11 is now disengaged from the driving element formed by the pulley 14 and the plate 20, permitting the shaft and the mechanism associated therewith to remain stationary while the pulley continues to rotate under driving action of a belt or other means not shown.

The operation of the pawl 47 may be controlled by a bar 60 having a downwardly directed projection 61 in which a slot 62 is formed, which slot engages a pin 63 projecting from the pawl 47 as shown in Fig. 5. When it is desired to operate the clutch, a pull is exerted upon the bar 60 in the direction of the arrow 65, Fig. 5, thus lifting the pawl out of the path of the projecting portion 25 of the engagement member 17, whereupon the action of the spring 40 immediately moves the arm 24 in a direction opposite to the arrow 51, Fig. 4, into the position at the rearward end 39 of the sloped portion 38 forming part of the cam slot 27. This produces a lateral movement of the bar 23 in a direction opposite to that indicated by the arrow 52 with the result that the engagement end 18 is forcibly projected into a passing opening 19 and driving engagement formed between the plate 20 and the member 11.

The invention employs means whereby the clutch is prevented from repeating, or in other words, prevented from making more than a single revolution. This mechanism is illustrated in Fig. 5. Projecting from the rearward face 70 of the member 11 is a cam 71 having a peak 72 which is disposed substantially in alignment with the engagement member 17. Let it be considered that the bar 60 has been pulled outwardly in the direction of the arrow 65 and has been held in this position either manually or due to binding of associated parts so that the pawl 47 is held in the position shown in full lines in this figure. The cam and the engagement member 25 will rotate in the direction of the arrow 75 through the position indicated in full lines at 76 to the position indicated by dotted lines 77, whereupon the forward end 78 of the bar 60 will be engaged by the cam 72 and raised into the position shown by the dotted lines 79. Whereupon the slot 62 will be lifted from engagement with the pin 61, allowing the pawl 47 to move under the action of the spring 80 into engagement position as indicated by the dotted lines 81, so that the engagement end 25 of the member 17 will be moved in the slot portion 38 as previously described, and the clutch member 11 thereby disengaged from the driving elements. Before the clutch can again be actuated, the member 60 must be moved forwardly into the position indicated by dotted lines 82, so that the slot 62 can drop down over the pin 61. It will be readily recognized that this mechanism effectually prevents repeating by the clutch even though the operator carelessly holds the bar in outward position.

In Fig. 6, I show mechanism employed in conjunction with Fig. 5, for preventing operation of the clutch while one of the worker's hands is in a position of danger. This mechanism consists of a shaft 85, mounted in suitable bearing members 86 and having a horizontally extending lever arm 87 and an upwardly extending lever arm 88 to which the end 89 of the bar 60, previously shown in Fig. 5, is pivotally secured. It will be recognized that a downward movement of the lever arm 87, as indicated by the arrow 90, would be productive of a movement of the bar 60 in the direction of the arrow 91. For downwardly depressing the lever arm 87, I employ a balance arm 92 having depressing means such as the vertical rods 93 and 94 at the ends thereof, which rods may be supported by brackets 95. Depressing the vertical rod 93, without simultaneously depressing the rod 94, is productive of merely swinging of the balance bar 92 into the position indicated by the line a—a which is productive of no downward movement in the lever arm 87. However, if the rod 93 is held downwardly by the operator's left hand and the rod 94 then depressed by the right hand, a downward movement of the lever arm 87 will be produced and the bar 60 moved into a direction causing withdrawal of the pawl 47. It will be recognized that with this arrangement, it is necessary to depress both ends of the balance arm 92 simultaneously and that this can be accomplished only by use of both hands of the operator and, therefore, positively prevents injury to the worker's hands due to carelessness.

I claim as my invention:

1. In combination: a driving member rotatably disposed on a shaft; a driven member non-rotatably disposed on said shaft comprising a housing having a peripheral slot formed in the periphery thereof; an engagement member arranged to provide driving engagement between said driving and driven members comprising a cylindrical bar slidably and rotatably disposed within said driven member, and an operating arm extending from said cylindrical bar and through said slot and to the exterior of said driven member; and actuating mechanism comprising an actuating pawl for engaging the exterior extension of said operating arm of said engagement member, and a control bar for removing said pawl from said engagement with said operating arm of said engagement member for allowing said engagement member to move into engagement position.

2. In combination: a driving member providing a number of openings rotatably disposed on a shaft; a driven member keyed to said shaft comprising a housing having a slot formed in the periphery thereof and having a cylindrical opening provided therein, and a clutch plate having a cylindrical opening secured to said housing, said cylindrical openings being in alignment; an engagement member comprising a cylindrical bar disposed in said cylindrical openings and axially slidable therein, and an operating arm extending from said cylindrical bar and through said slot to the exterior of said housing; and actuating mechanism for determining the disposition of said engagement member comprising an actuating pawl for engaging the outer end of said operating arm in a manner to hold said engagement member in non-engaging disposition, and a control bar for removing said pawl from engagement with said engagement member so as to allow said engagement member to move in such a manner that said cylindrical bar will enter one of said openings in said drive member and provide driving engagement therebetween.

3. In a non-repeating clutch, the combination of: a drive member; a driven member; an engagement member arranged to provide driving engagement between said driving and driven members; an actuating pawl arranged to engage said engagement member so as to retain said engagement member in non-engaging disposition; a control bar for removing said pawl from engaging said engagement member; a cam formed on said driven member; a cam follower formed integral with said control bar and arranged to engage said cam in such a manner as to cause said control bar to release said pawl if said pawl is retained in non-engaging position.

4. In a non-repeating clutch, the combination of: a drive member, a driven member; an engagement member arranged to provide driving engagement between said driving and driven members; an actuating pawl arranged to engage said engagement member so as to retain said engagement member in non-engaging disposition; means for resiliently retaining said pawl in said engagement with said engagement member; a control bar having a slot formed therein arranged to engage a pin on said pawl for removing said pawl from engaging said engagement member; a cam formed on said driven member; a cam follower formed integral with said control bar and arranged to engage said cam in such a manner as to cause said slot in said bar to release said pin allowing said pawl to return to said engaging position, if said pawl is held in non-engaging position by said bar.

In testimony whereof, I have hereunto set my hand at Riverside, California, this 4th day of June, 1924.

GEORGE WILCOX.